March 24, 1959   F. G. WILLEY   2,878,710
OPTICAL SCANNING SYSTEM
Filed July 16, 1954
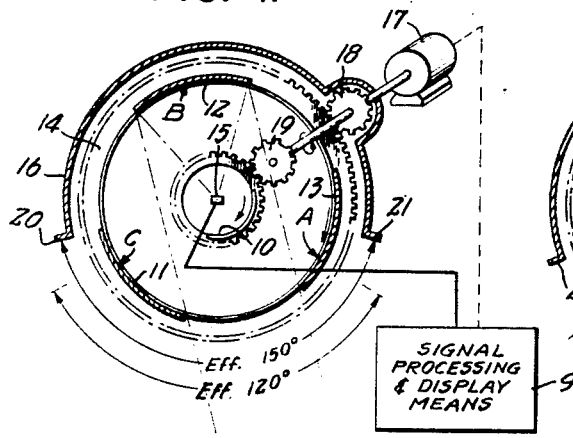
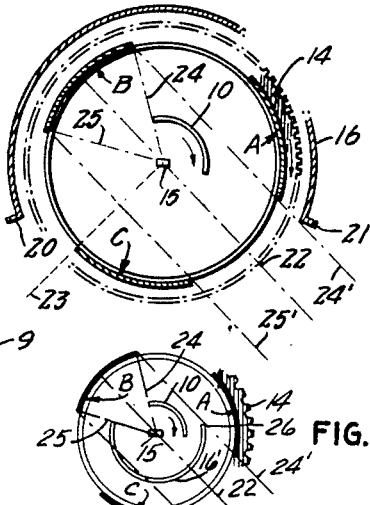
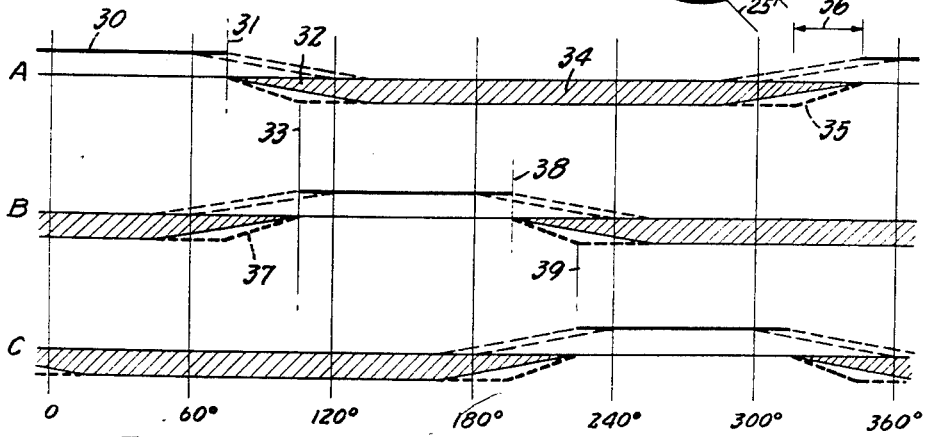
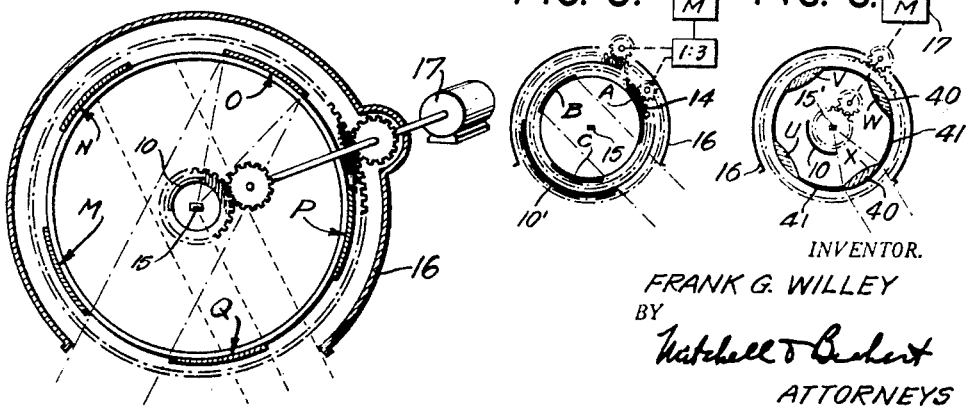
INVENTOR.
FRANK G. WILLEY
BY
*Mitchell & Bechert*
ATTORNEYS

United States Patent Office

2,878,710
Patented Mar. 24, 1959

2,878,710

OPTICAL SCANNING SYSTEM

Frank G. Willey, Roslyn Heights, N.Y., assignor to Servo Corporation of America, New Hyde Park, N.Y., a corporation of New York Application July 16, 1954, Serial No. 443,875

13 Claims. (Cl. 88—1)

My invention relates to an improved optical scanning device and is in the nature of an improvement over the invention disclosed in copending patent application Serial No. 320,272, filed November 13, 1952, in the names of Henry Blackstone and Frank G. Willey.

It is an object of the invention to provide improved means of the character indicated.

It is another object to provide an improved scanning mechanism employing a plurality of optical systems in conjunction with one or more energy-responsive elements.

It is a further object to meet the above objects with a mechanism providing an inherently wider angle of scan for any particular geometrical configuration of scanning elements.

It is a specific object to meet the above objects with a system requiring no additional energy-responsive means and, furthermore, no substantial added complexity of signal-processing or display means in the achievement of a wider angle of scan.

Other objects and various further features of novelty and invention will be hereinafter pointed out or will become apparent to those skilled in the art from a reading of the following specification in conjunction with the accompanying drawings. In said drawings, which show, for illustrative purposes only, preferred forms of the invention:

Fig. 1 is a schematic representation of mechanical, optical, and electrical elements of a scanning mechanism incorporating features of the invention, the general aspect being as viewed along the axis of rotation of the principal rotated parts;

Fig. 2 is a simplified version of the organization of Fig. 1, but with the parts in a different relation;

Fig. 2A is a view similar to Fig. 2 to illustrate a modification;

Fig. 3 is a graphical representation of the functioning of parts in Figs. 1 and 2; and Figs. 4 to 6 are simplified views similar to Fig. 1, but illustrating modifications, Figs. 5 and 6 being on a reduced scale.

Briefly stated, my invention contemplates a multiple-element optical scanning mechanism of the type disclosed in greater detail in the above-identified copending application, and I modify this construction by addition of a movable mask (or shutter) and by enlarging the opening of the stationary mask in order to achieve wider angle of scan. It is inherent in the operation of scanning mechanisms of the character indicated, that is, without provision of my new shutter, that 50 percent of the time is useless for scanning purposes, inasmuch as this time is required to bring a complete bundle of incoming rays fully out into the open past the stationary mask, the other 50 percent of the time being available for utilization of the full bundle of rays. By providing a suitably positioned movable mask (or shutter) rotatable about the scanning axis, and at a speed which is a multiple of the scanner speed (said multiple corresponding to the number of optical systems in the scanner), I in effect provide for quicker opening and masking of the full bundle of incoming rays; thus, what was 50 percent dead time inherent in the previous organization can be merely 25 percent dead time. By reducing the dead time to substantially 25 percent, I extend the angle of view by a factor of 50 percent, without requiring any added complexity in such signal-processing or display means as may have been provided to interpret the output of the energy-responsive cell at the focus of the optical systems.

Figs. 1, 2, and 3 are devoted to the application of my novel movable mask or shutter 10 to a three-system scanner involving three like optical elements 11—12—13 (also labelled A—B—C), such as focusing mirrors, mounted on support means 14 in equally spaced relation, the spacing being substantially equal to the effective width of each optical element. The support means 14 is revoluble on means not shown, about a central axis of rotation which may be the focus for each of the like optical systems 11—12—13, and consistent with the disclosure in said copending application, energy-responsive means 15, such as a photoelectric, photoconductive or the like cell, is mounted substantially on said axis. Movable mask or shutter 10 is supported (by means not shown) for edge-driven rotation about the scanning axis, and when located inside the drum 14 (as shown), the effective radius of shutter 10 is preferably as small as tolerable, it being understood that the radius of shutter 10 is exaggerated in the drawing, to facilitate description. In order that microphonic and other noises may be minimized, I prefer that cell 15 shall be fixedly mounted, that is, that it shall not be carried for rotation with the scanner drum or support 14. The output of cell 15 may be processed and synchronized with scanner action to create a display or record, at means 9, discussed in greater detail in said copending application.

Stationary mask means 16 may be provided within the scanner drum 14 or external thereto as shown. By "stationary" I mean merely that the mask 16 is not normally rotated with rotation of drum 14, but, of course, it will be understood that means (not shown) may be employed for bodily displacement of the stationary mask 16, in the event of shifting the field of view or the orientation of the device. A single drive means 17 may be geared at 18 to the drum 14, and at 19 to the rotary support for mask 10, in such manner that the drive to both drum 14 and mask 10 is in the same direction; this geared relation also preferably assures that the mask 10 will be rotated at a speed representing a multiple of the drum speed, said multiple corresponding to the multiplicity of optical systems, which of course means that for the three-element arrangement shown the mask 10 shall be driven at three times the drum speed.

I have discovered that, upon a proper selection of effective angular opening of the stationary mask 16 and of effective masking width of the shutter 10, it is possible to reduce by a factor of two the dead time ordinarily inherent in scanning action in a multiple-element scanner as described. For the three-element case shown, the masking width of shutter 10 is preferably substantially 120 degrees, representing a full operative cycle for any one of the three optical systems with respect to energy-responsive means 15. Under these circumstances, it is possible to extend the effective angular opening of the stationary mask (between limits 20—21) from the 120 degrees which previously obtained (without shutter 10) to 150 degrees (with shutter 10).

By describing the opening of stationary mask 16 as being of an angle of effectively 150 degrees, it will be understood that I mean that effective angle which extends from the outer limiting ray of a full bundle of rays collected by any one mirror, such as the mirror 12 (for one extreme of a scanning sweep) to the outer limiting ray of the full bundle of rays from the same mirror when first intercepted by the stationary mask 16 (at the other extreme of the scanning sweep). Because the stationary mask 16 is shown outside the scanner drum 14 in occulting relation with collimated rays rather than with diverging rays, it is difficult to identify this angle as being exactly 150 degrees. However, if an alternative stationary mask 16' (see Fig. 2A) were placed inside the scanner drum 14 and primarily in occulting relation with the converging bundle of rays, rather than with the collimated bundle of rays (as for mask 16), then this preferred angle of 150 degrees will be more clearly seen to apply. Since the net effect with regard to occultation of rays is the same whether the fixed mask is outside (16) or is inside (16') the scanner drum 14, it will be understood that references herein to effective angular width of the stationary mask, regardless of its location inside (16') or outside (16) drum 14, may be described by the same terms, and that for the three-mirror case shown the effective width is 150 degrees and is so labelled in Fig. 1.

The preferred synchronizing relationship for rotation of the scanner drum with respect to rotation of mask 10 and with respect to the opening of stationary mask 16 or 16' may best be understood by reference to Fig. 2, which depicts the situation at the instant of commencement of a scanning sweep (clockwise, from right to left) by the mirror B. The angular field of the scan sweep extends from the axis 22 to the axis 23, and for the three-mirror case shown, this is substantially a 90-degree field of scan. At the instant of commencing scan (collimated bundle 24'—25' on axis 22) the moving mask or shutter 10 is just passing out of occulting relation with the limiting converging ray 24 of the bundle collected by mirror B. For the case in which the stationary mask 16' is inside the scanner drum 14, the other limiting convergent ray 25 will also be just passing out of the region occulted by mask 16'; but for the case of an external stationary mask 16 the outer ray 24' of the collimated bundle is, at this instant, just clearing the edge 21 of the stationnary mask 16.

By the time the mirror B has progressed through 90 degrees of scan, that is, when the instantaneous optical axis is at 23, the leading edge of the movable mask or shutter 10 will have gone through almost a complete revolution and will just commence to occult the limiting ray 25 of the converging bundle applicable for the viewing axis 23. At the same time, for the case of an inner stationary mask 16', the other converging limiting ray 24 will be occulted by the edge 26; and for the case of an outer stationary mask 16, the outer collimated ray 25' will be occulted by the edge 20. Further rotation of the scanner, and accompanying three-times-faster rotation of the shutter 10, will cause mirror B to be eclipsed fully in about 30 degrees of drum rotation.

A better understanding of the cycle of operation may be had by reference to Fig. 3, in which the separately plotted functions labeled A, B, and C are plotted on the same abscissa, representing degrees of rotation of the scanner drum 14; the plots labeled A, B, and C are identified with functions attributable to mirrors A, B, and C, respectively, of the scanner. At the origin shown, mirror A is already in the course of scanning the field of opening 20—21 of mask 16, and the heavy line 30 designates that a full electrical response is achievable from the cell 15 because there is no substantial occultation of rays in the received bundle, it being understood (as indicated above) that the radius of shutter 10 is as small as possible and in any event of smaller radial proportions than suggested by the drawing. Scanning may continue until the instant 31, at which time the shutter 10 and the stationary mask 16 cooperate to occult the ray bundle. If there were no shutter 10, a full 60 degrees of scanner-drum rotation, as suggested by the shaded wedge 32, would be required to perform the occultation. However, shutter action is such as to achieve this function within a substantially smaller angle (30 degrees) so that at the instant 33 rays received by mirror A are fully occulted, no response of cell 15 can be attributable to rays collected by mirror A. As far as mirror A is concerned, masking continues throughout the period designated by shaded area 34; at the end of the masking period for mirror A, the shutter 10 performs a further function (suggested by dashed outlines 35) to prolong the period of masking mirror A and to result in a quicker opening interval 36 (30 degrees) for re-exposure of the cell 15 to rays collected by the mirror A.

The described cycle for mirror A applies equally well for the scan cycles of mirrors B and C, except that, since these mirrors are 120 degrees phase-displaced from mirror A, their functions will be displaced accordingly. Thus, at the instant 33 when incoming rays collected by mirror A have just become fully occulted, the quick-opening action of shutter 10, as suggested at 37, first fully exposes cell 15 to the full bundle of rays collected by mirror B; this instant 33 is the instant depicted in Fig. 2. Mirror B may then continue for its full course of 90 degrees, representing a wide angle of scan (and full potential electrical response) until the instant 38, when shutter action and stationary-mask action cooperate (for the period terminating at instant 39) to establish a quick occultation of rays collected by mirror B. During this period 38—39, mirror C is being quickly unmasked by the described shutter action, so that at instant 39 mirrors A and B are fully masked, and rays collected by mirror C are fully exposed to the cell 15, whereupon mirror C can progress through the same wide angle (90 degrees) of scan. The cycle thereafter repeats itself, as will be understood.

By reference to Fig. 3, it will be seen that the only times devoted to masking and unmasking rays to cell 15 are the interval 31—33, the interval 38—39, and the interval 36. Each of these intervals is of 30-degrees duration, and all the remaining cycle of the scanning drum 14 is devoted to the gathering of intelligence through scan action. This means, of course, a dead time of only 25 percent of the scan cycle, rather than 50 percent, as was previously the case.

In Fig. 4, I show adaptation of the principles of the invention to a five-mirror system in which the mirrors M—N—O—P—Q are equally spaced and in which the spacing between mirrors is substantially equal to the width of the mirrors, all as described in Fig. 1, except, of course, for the number of mirrors. Because the action of shutter 10 is preferably symmetrical for a scan of the field by each successive mirror, it is necessary that the shutter be driven at five times the scanner drum speed and in the same direction, as suggested by the scale of gear drives shown.

In Fig. 5, I show an arrangement similar to Fig. 1 in which the scanner drum 14 again has three mirrors (A—B—C), but in which the rotating shutter 10' is outside the scanner drum and therefore masks collimated rather than convergent rays. For all practical purposes, the instant depicted in Fig. 5 may be considered analogous to the instant 33 depicted in Fig. 2 and identified in Fig. 3. The shutter 10' is again driven at three-times drum speed, and action is otherwise as described for Figs. 1 and 2. Because shutter 10' acts on collimated rather than convergent rays, its width must be described as effectively 120 degrees, although in actuality its width about the scanning axis may exceed this, depending upon the effective radius of shutter 10', with respect to the effective radius of drum 14.

In Fig. 6, I show that principles of the invention are equally applicable to scanners employing lenses in place of focusing mirrors and to systems in which the number of optical systems is not necessarily an odd number. For example, in Fig. 6 the number of like optical systems 40

(U—V—W—X) is four, and these optical systems are again spaced by amounts substantially equal to their widths. In order to reduce background noise due to stray rays impinging on the cell 15', I prefer that the scanner drum shall be opaqued at regions 41 between lenses 40. The preferred shutter width is substantially 112½ degrees, and, of course, since four optical systems are involved, the shutter 10 should be driven at four-times drum speed. Also, the active area of cell 15 will have to face the opening of mask 16 rather than away therefrom, as is the case for the mirror configurations of Figs. 1, 4 and 5.

Generalizations are not always possible or desirable, but, in accordance with my present view of the invention, I find it convenient to employ a table somewhat as follows, to describe scanners of the character indicated having various pluralities of like optical systems:

| Number of optical elements | 3 | 4 | 5 | $n$ |
|---|---|---|---|---|
| Angle of view (without shutter 10) | 60 | 45 | 36 | $\frac{\pi}{n}$ radians |
| Wide angle of view (with shutter 10) | 90° | 67½° | 45° | $1.5\left(\frac{\pi}{n}\right)$ radians |
| Shutter speed (times driven speed) | 3× | 4× | 5× | $n\times$ |
| Effective shutter width (masking) | 120° | 112½° | 108° | $\frac{\pi}{2}\left(\frac{n+1}{n}\right)$ radians |
| Effective width of stationary-mask opening | 150° | 112½° | 90° | $2.5\left(\frac{\pi}{n}\right)$ radians |

It will be seen that I have described a mechanism for improving the efficiency of scanners of the character indicated and more particularly for increasing the angle of view of a given scanner without increasing its optical or electronic complexity. The additional mechanical complexity is slight and involves no important difficulty in application to existing scanners. The rotating shutters or fixed masks may be either inside or outside of the scanning drum and, if inside, may be located, and preferably are located, as close as possible to the cell 15 in order that size (and attendant masking of collimated rays) may be minimized; in my practical experience with a three-mirror wide-angle scanner of the character described (form of Fig. 1), I have so much reduced the necessary size of the moving shutter that there is no noticeable diminution of energy collected by the scanning optics. In fact, I have discovered that, at the fringes of the field of scan, any occultation by the shutter, as long as such occultation is marginal, will not impair the ability of the scanner to achieve useful information. This means, of course, that the field of view, if one can tolerate marginal occultation, is even wider than specified in the above tabulation. It should be noted that the above tabulation applies best for the three-mirror or three-optical-system case, in that no marginal occultation can occur within the 90-degree field stated. For higher pluralities of optical systems, there is some marginal occultation just before attainment of the outer limits of the fields set forth, but even in these cases the degree of improvement and width of scanned field is substantially 50 percent, as indicated.

While I have described the invention in detail for the preferred forms shown, it will be understood that modifications may be made within the scope of the invention as defined in the claims which follow.

I claim:

1. Scanning optics, comprising $n$ like optical systems, support means holding said systems in equally spaced relation about an axis of rotation, the spacing between said systems being substantially equal to the effective width of each of said systems, a stationary mask of effective angular opening substantially exceeding $$\frac{2\pi}{n}$$

radians about said axis, a movable mask mounted for rotation about said axis and of effective angular masking width of substantially $$\frac{2\pi}{n}$$

radians about said axis, radiation-responsive means fixedly mounted with respect to said stationary mask and at the focus of said optical systems as said optical systems are exposed through the opening in said stationary mask, and means driving said support means and said movable mask in the same direction of rotation about said axis, the angular speed of rotation of said movable mask being $n$ times that of said support means.

2. Scanning optics, comprising three like optical elements, support means holding said elements in equally spaced relation about an axis of rotation, the spacing between said elements being substantially equal to the effective width of each element, a stationary mask of effective angular opening substantially exceeding 120 degrees about said axis, a movable mask mounted for rotation about said axis and of effective angular masking width of substantially 120 degrees about said axis, energy-responsive means at the focus of said elements and non-rotatably supported with respect to said support means, and means driving said movable mask continuously at a speed three times that of said support means and in the same direction about said axis.

3. Scanning optics, comprising three like mirrors, support means holding said mirrors in equally spaced relation about an axis of rotation and oriented to focus all mirrors substantially on the axis of rotation, the spacing between said mirrors and the width of said mirrors being substantially 60 degrees, a stationary mask of effective angular opening of substantially 150 degrees about said axis, a movable mask mounted for rotation about said axis and of effective angular masking width of substantially 120 degrees about said axis, an energy-collecting element at the focus of said mirrors, and means for continuously driving said support means and said movable mask in the same direction, said mask moving three times the speed of said support means.

4. Scanning optics according to claim 3, in which the drives to said movable mask and to said support means are so synchronized that, at the commencement of scan by one of said mirrors, edges of said stationary mask and of said movable mask are each angularly adjacent one of the limiting rays of the full bundle collected by said one mirror.

5. Scanning optics according to claim 3, in which the drives to said movable mask and to said support means are so synchronized that, at the end of scan by one of said mirrors, edges of said stationary mask and of said movable mask are each angularly adjacent one of the limiting rays of the full bundle collected by said one mirror.

6. Scanning optics, comprising four like optical elements, support means holding said elements in equally spaced relation about an axis of rotation, the spacing between said elements being substantially equal to the effective width of each element, a stationary mask of effective angular opening of substantially 112 degrees about said axis, a movable mask mounted for rotation about said axis and of effective angular masking width of substantially 112 degrees about said axis, energy-responsive means at the focus of said elements and non-rotatably supported with respect to said support means, and means driving said movable mask continuously at a speed four times that of said support means and in the same direction about said axis.

7. Scanning optics, comprising five like optical elements, support means holding said elements in equally spaced relation about an axis of rotation, the spacing between said elements being substantially equal to the effective width of each element, a stationary mask of effective angular opening of substantially 90 degrees about said axis, a movable mask mounted for rotation about said axis and of effective angular masking width of substantially 108 degrees about said axis, energy-responsive means at the focus of said elements and non-rotatably supported with respect to said support means, and means driving said movable mask continuously at a speed five times that of said support means and in the same direction about said axis.

8. Scanning optics, comprising $n$ like optical systems, support means holding said systems in equally spaced relation about an axis of rotation, a stationary mask of effective angular opening substantially exceeding $$\frac{2\pi}{n}$$

radians about said axis, a movable mask mounted for rotation about said axis and of effective angular masking width of substantially $$\frac{2\pi}{n}$$

radians about said axis, said movable mask being located radially within the radius at which said optical systems are supported, radiation-responsive means fixedly mounted with respect to said stationary mask and substantially on said axis of rotation, and means driving said support means and said movable mask in the same direction of rotation about said axis, the angular speed of rotation of said movable mask being $n$ times that of said support means.

9. Scanning optics, comprising $n$ like optical systems, support means holding said systems in equally spaced relation about an axis of rotation, a stationary mask of effective angular opening substantially exceeding $$\frac{2\pi}{n}$$

radians about said axis, a movable mask mounted for rotation about said axis and of effective angular masking width of substantially $$\frac{2\pi}{n}$$

radians about said axis, said movable mask being loacted radially outside the radius at which said optical systems are supported, radiation-responsive means fixedly mounted with respect to said stationary mask and substantially on said axis of rotation, and means driving said support means and said movable mask in the same direction of rotation about said axis, the angular speed of rotation of said movable mask being $n$ times that of said support means.

10. Scanning optics, comprising $n$ like optical systems, support means holding said systems in equally spaced relation about an axis of rotation, a stationary mask of effective angular opening substantially exceeding $$\frac{2\pi}{n}$$

radians about said axis, said stationary mask being located radially outside the radius at which said optical systems are supported, a movable mask mounted for rotation about said axis and of effective angular masking width of substantially $$\frac{2\pi}{n}$$

radians about said axis, radiation-responsive means fixedly mounted with respect to said stationary mask and substantially on said axis of rotation, and means driving said support means and said movable mask in the same direction of rotation about said axis, the angular speed of rotation of said movable mask being $n$ times that of said support means.

11. Scanning optics, comprising $n$ like optical systems, support means holding said systems in equally spaced relation about an axis of rotation, a stationary mask of effective angular opening substantially exceeding $$\frac{2\pi}{n}$$

radians about said axis, said stationary mask being located radially within the radius at which said optical systems are supported, a movable mask mounted for rotation about said axis and of effective angular masking width of substantially $$\frac{2\pi}{n}$$

radians about said axis, radiation-responsive means fixedly mounted with respect to said stationary mask and substantially on said axis of rotation, and means driving said support means and said movable mask in the same direction of rotation about said axis, the angular speed of rotation of said movable mask being $n$ times that of said support means.

12. Scanning optics, comprising four like lenses, support means holding said lenses in equally spaced relation about an axis of rotation, the spacing between said lenses being substantially equal to the effective width of each lens, a stationary mask of effective angular opening of substantially 112 degrees about said axis, a movable mask mounted for rotation about said axis and of effective angular masking width of substantially 112 degrees about said axis, energy-responsive means at the focus of said lenses and non-rotatably supported with respect to said support means, and means driving said movable mask continuously at a speed four time that of said support means and in the same direction about said axis.

13. Scanning optics, comprising $n$ like optical systems, support means holding said systems in equally spaced relation about an axis of rotation, the spacing between said systems being substantially equal to the effective width of each of said systems, a stationary mask of effective angular opening substantially exceeding $$\frac{2\pi}{n}$$

radians about said axis, a movable mask mounted for rotation about said axis and of effective angular masking width of substantially $$\frac{\pi}{2}\left(\frac{n+1}{n}\right)$$

radians about said axis, radiation-responsive means fixedly mounted with respect to said stationary mask and at the focus of said optical systems as said optical systems are exposed through the opening in said stationary mask, and means driving said support means and said movable mask in the same direction of rotation about said axis, the angular speed of rotation of said movable mask being $n$ times that of said support means.

No references cited.